Sept. 18, 1962   O. HOULE   3,054,423

CLOSE-OPEN AND DIVERTER VALVE

Filed March 30, 1960

Inventor

OMER HOULE

By R. J. Tompkins

Attorney

United States Patent Office 3,054,423
Patented Sept. 18, 1962

3,054,423
CLOSE-OPEN AND DIVERTER VALVE
Omer Houle, Chelmsford, Mass., assignor, by mesne assignments, to the United States of America as represented by the Secretary of the Navy
Filed Mar. 30, 1960, Ser. No. 18,787
5 Claims. (Cl. 137—609)

This invention relates to diverter valves and more particularly to compact, remote controlled diverter valves which respond to a signal so as to positively close off either one of two discharge lines. The valve also provides an automatically controlled inlet which is only open when the valve is being used.

In valving systems used in aircraft fuel supply systems, positive response as well as low weight are both desirable. This invention provides a compact valve body containing a quickly responding open and close valve along with a positively actuated diverter valve. Thus, the arrangement as taught by the present invention overcomes weight and reliability problems. The compact arrangement is especially attributable to the unique manner in which the open-close valve and diverter valve are arranged in combination. The valve means are arranged perpendicular to each other so that the interconnecting passages are always aligned so as to substantially approximate straight line distances, i.e., minimum distances. Thus, a minimum amount of weight is present.

The valve means are enclosed within an interconnecting passageway network and are so arranged as to positively respond to actuating means especially suited for the compact arrangement. This positive and instantaneous response is caused by two simple servomotor arrangements which automatically move the valves to open or close the various passageways as is desired.

This invention is therefore, especially suited for use in an afterburner fuel distribution system for a turbo-compressor aircraft engine wherein two different fuels are pumped at different times into the diverter valve assembly. The valve assembly positively shuts off both discharge lines when no pumping occurs thus preventing fuel leak-over into the afterburner section and according to selected signal input, passes either one of the two fuels into the proper discharge passage. The discharge passages supply fuel to one of either two different fuel systems which discharge into an afterburner combustion chamber.

An object of the present invention is the provision of a compact valve assembly especially suited for diverting fuels to different portions of an afterburner fuel system.

Another object of the invention is to provide a valve assembly which will close off the fuel supply to both of two discharges under one condition and will close off fuel to only one of either of two discharges under other conditions.

A further object of the invention is to provide positive and quick shut-off means in a fuel supply diverter valve.

Other objects and many of the attendant advantages of this invention will be readily appreciated as the same becomes better understood by reference to the following detailed description when considered in connection with the accompanying drawings wherein.

Figure 1:
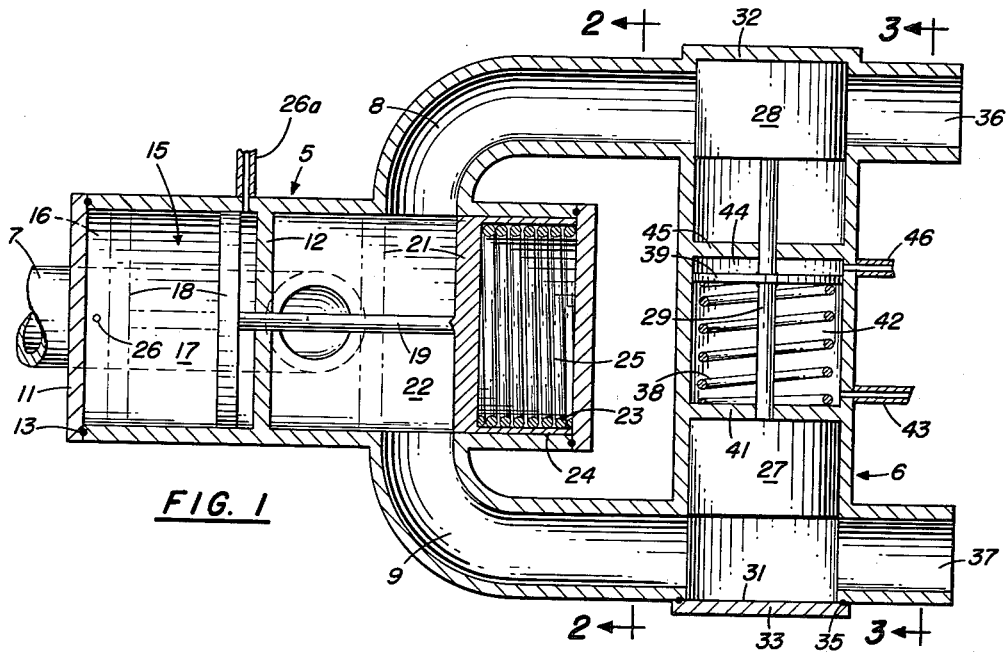
FIG. 1 shows a longitudinal cross-section of a preferred embodiment of the invention.
Figure 2:
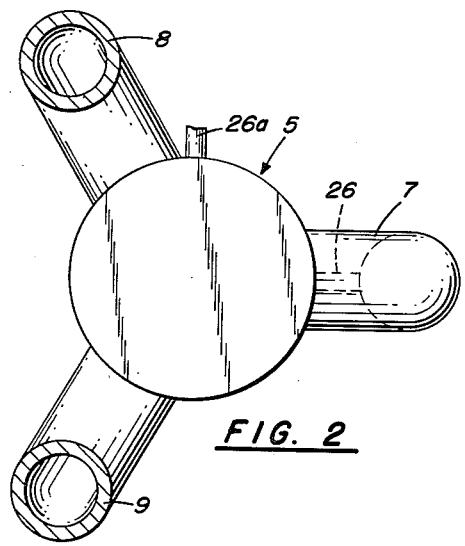
FIG. 2 shows a section of the device taken on the line 2—2 of FIG. 1 looking in the direction of the arrows.
Figure 3:
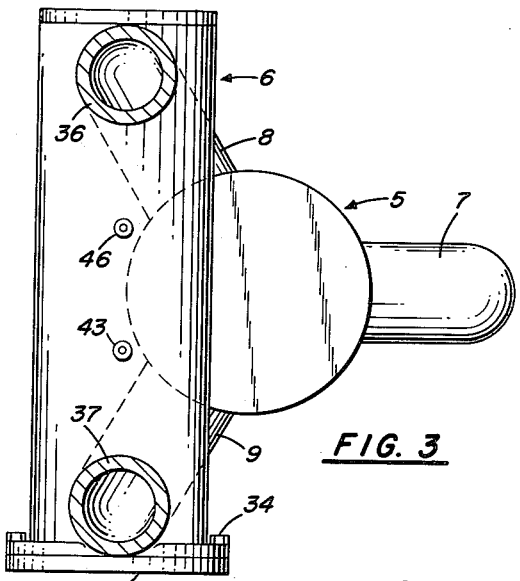
FIG. 3 shows a section of the device taken on the line 3—3 of FIG. 1 looking in the direction of the arrows.

Referring now to the drawings wherein like reference characters designate like or corresponding parts throughout the several views, there is shown in FIG. 1 a horizontal cylindrical valve body 5 and a vertical cylindrical valve body 6. An inlet 7 passes pumped fluid into valve body 5 and passageways 8 and 9 connect valve body 5 with valve body 6. The outside end of valve body 5 is closed by plate 11. O-ring 13 seals the joint between plate 11 and valve body 5. A servomotor 15 is mounted in the outside end of valve body 5. Pressure chambers 16 and 17 are formed on either side of a piston 18 by valve body 5 and end plates 11 and 12.

Piston 18 drives a shaft 19 which is attached to a valve plug 21. Valve plug 21 closes the passageway 22 between valve body 5 and passageways 8 and 9 when it is biased by springs 23 into the closed (dotted) position. When plug 21 unseats due to servomotor 15 acting on rod 19 it assumes an open position as shown in full lines whereby passageway 22 fully communicates with passageways 8 and 9. Plug 21 is attached to a cylindrical member 24 which provides axial support. Both members 24 and spring 23 are positioned within chamber 25 which is formed in the inner end of valve body 5.

Inlet passageway 7 is connected to chamber 16 by orifice 26. An inlet is provided at 26a for pressure chamber 17. Passageways 8 and 9 connect to vertical cylindrical valve body 6. Valve body 6 contains a valve piston 27 which blocks passageway 9 when passageway 8 is open. A second valve piston 28 is attached to valve piston 27 by rod 29 and blocks passageway 8 when passageway 9 is open. Piston 27 when closed contacts valve seat 31 formed in removable plate 33 which is attached to valve body 6 by bolts 34. Piston 28, when closed, contacts valve seat 32 formed in valve body 6. Plate 33 may be removed to drain the valve body. The joint between valve body 6 and plate 33 is sealed by O-ring 35. Outlets 36 and 37 are provided in valve body 6.

Valve piston 28 is normally biased by spring 38 against seat 32. Spring 38 acts on piston 39 which is attached to rod 29 and bears on end wall 41. End wall 41, valve body 6, and piston 39 form a pressure chamber 42 which has an inlet 43. Another pressure chamber 44 is formed on the opposite side of piston 39 by valve body 6, end wall 45 and piston 39. Inlet 46 communicates with pressure chamber 44.

In the operation of the valve it must first be understood that the valve is designed for use in an afterburner fuel system and intended to carry either conventional or high energy fuel and provide a means for diverting each fuel to its appropriate passage. Piston 18 and valve plug 21 are connected by rod 19 and when no fuel is flowing piston 18 and plug 21 are in their left most position so that plug 21 closes off lines 8 and 9 (as shown in dotted lines). Piston 18 and plug 21 are held in this position by a positive pressure in chamber 17, through inlet 26a, and by spring 23, which seals off passageways 8 and 9 and prevent any leakage of fuel across plug 21 and into the afterburner fuel systems. When afterburner fuel under pressure begins to flow through inlet 7, a portion of it enters chamber 16 through orifice 26 and drives piston 18 and plug 21 to the right thereby exposing lines 8 and 9, whereupon fuel may be delivered to the afterburner. The fuel diverts into either one or the other of the outlet passageways 36 or 37 according to the position of the diverter valve. Piston 28 is held in the position shown by spring 38 and pressure in chamber 42, through inlet 43, when conventional fuel is being pumped, allowing that fuel to pass through passageway 9 into outlet 37. Upon the selection of high energy fuel by manual operation of a lever (not shown) in the pilot's compartment, a high pressure is introduced into chamber 44, through inlet 46, which acts against piston 39 driving it downward and carrying with it the pistons 27 and 28 thereby closing off passageways 9 and 37 and opening outlet 36 to receive high energy fuel from line 8.

When it is desirable to return to conventional fuel a high pressure is introduced into chamber 42, through inlet 43 while the pressure supply to chamber 44 is cut off. This causes a pressure build-up in chamber 42 which results in a force acting on piston 39. This force plus spring 38 moves piston 28 so as to close passageways 8 and 36 and open outlet 37 to receive conventional fuel from line 9.

When fuel stops flowing in inlet passageway 7 pressure enters chamber 17 through inlet 26a to act on piston 18 along with spring 23 to move valve plug 21 into its closed position.

Obviously many modifications and variations of the present invention are possible in the light of the above teachings. It is therefore to be understood that within the scope of the appended claims the invention may be practiced otherwise than as specifically described.

What is claimed is:

1. A valve suitable for use in a dual fuel afterburner system comprising a casing, a first piston including a connecting rod having a piston head at one end thereof slidably disposed within said casing and movable from an initial position to an operating position, means disposed within said casing in engagement with said piston for normally maintaining the piston in said initial position, a complementary piston disposed within the casing at a right angle and spaced relationship with respect to said first piston, said piston including a connecting rod having a piston head at each terminal end thereof slidably disposed within said casing and movable selectively in either direction of two directions to an operating position, disc means carried by said connecting rod of the first piston at the other end thereof and responsive to a predetermined pressure for moving the first piston from said initial position to said operating position, disc means carried by said connecting rod of the complementary piston and disposed between said piston heads thereon and responsive to a predetermined pressure for moving the complementary piston so that the piston heads are alternately moved into sealing engagement with the casing, spring means in engagement with said disc means on the complementary piston for maintaining the complementary piston in an initial position, fuel conduits on the casing and providing fluid communication between the first and complementary pistons, and means on the casing in communication with said fuel conduits for porting fuel from the casing in accordance with the position of the piston heads on said connecting rods.

2. A valve of the character described comprising a casing, a first cylindrical member on said casing, a first pressure chamber and a fuel chamber disposed within said cylindrical member, an inlet port for said fuel chamber, a second cylindrical member on said casing, a pair of mutually spaced chambers disposed within said second cylindrical member and a second pressure chamber disposed there-between, means providing fluid communication between said fuel chamber and one of each of said pair of spaced chambers, an outlet port for one of each of said pair of spaced chambers in communication with the fluid communication means, a first unitary piston structure slidably disposed within the first cylindrical member and including a piston head disposed within the fuel chamber for controlling the flow of fuel between the fuel chamber and the pair of spaced chambers and a first pressure responsive means disposed within the first pressure chamber and connected to said piston to effect operation thereof, a second unitary piston structure slidably disposed within said second cylindrical member and including a pair of piston heads, one of each of said pair of piston heads being disposed within one of each of the spaced chambers for diverting the flow of fuel through the outlet ports in accordance with the position of the piston heads in the spaced chambers, said second unitary piston structure further including a second pressure means disposed within the second pressure chamber and connected to the pair of piston heads for effecting operation thereof.

3. A pressure actuated valve comprising a casing, a first cylindrical member on said casing, a first pressure chamber and a fuel chamber disposed within said cylindrical member, an inlet port in communication with said fuel chamber, a second cylindrical member on said casing, a pair of mutually spaced chambers disposed within said second cylindrical member and having a second pressure chamber disposed therebetween, a pair of fuel conduits providing fluid communication between said fuel chamber and said pair of spaced chambers, respectively, a unitary piston structure slidably disposed within said first cylindrical member and including a piston head disposed within said fuel chamber and normally sealing said fuel conduits and movable an amount sufficient to unseal the fuel conduits, said unitary piston structure further including a first pressure actuated disc disposed within the first pressure chamber and connected to said piston head for moving said piston head an amount sufficiently to unseal the fuel conduits and a rod connecting the piston head and disc, a second unitary piston structure slidably disposed within said second cylindrical member and including a pair of piston heads, one of each of said pair of piston heads being disposed within one of each of the spaced chambers for diverting the flow of fuel through the outlet ports in accordance with the position of the piston heads, said second unitary piston structure further including a second pressure actuated disc connected to the piston heads for selectively moving the piston heads into a position to divert the flow of fuel through the outlet ports and a rod member slidably disposed within the second cylindrical member for connecting the piston heads to the second disc.

4. A pressure actuated valve according to claim 3, including means connected to said first pressure chamber for establishing an external pressure connection thereto, and means disposed within said fuel chamber in engagement with first disc for maintaining the piston head in a position to seal the fuel conduits.

5. A pressure actuated valve according to claim 3 including means connected to said second pressure chamber for establishing an external pressure connection thereto, and means disposed within said second pressure chamber in engagement with the second disc for maintaining said second unitary piston structure in an initial position.

References Cited in the file of this patent

UNITED STATES PATENTS

| 599,099 | Hibbard | Feb. 15, 1898 |
| 1,099,713 | Morris | June 9, 1914 |
| 2,831,498 | Thomsen | Apr. 22, 1958 |
| 2,832,368 | Freer | Apr. 29, 1958 |
| 2,933,130 | Wright | Apr. 19, 1960 |
| 2,971,533 | Baurenlein | Feb. 14, 1961 |

FOREIGN PATENTS

| 726,474 | Great Britain | of 1955 |